United States Patent
Tang et al.

(10) Patent No.: US 11,243,767 B2
(45) Date of Patent: Feb. 8, 2022

(54) CACHING DEVICE, CACHE, SYSTEM, METHOD AND APPARATUS FOR PROCESSING DATA, AND MEDIUM

(71) Applicant: Beijing Baidu Netcom Science and Technology Co., Ltd., Beijing (CN)

(72) Inventors: Chao Tang, Beijing (CN); Xueliang Du, Beijing (CN); Yingnan Xu, Beijing (CN); Kang An, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/018,424

(22) Filed: Sep. 11, 2020

(65) Prior Publication Data
US 2021/0271475 A1    Sep. 2, 2021

(30) Foreign Application Priority Data

Feb. 28, 2020 (CN) .......................... 202010130183.4

(51) Int. Cl.
| | |
|---|---|
| G06F 9/30 | (2018.01) |
| G06F 9/38 | (2018.01) |
| G06F 9/54 | (2006.01) |
| G06F 12/0868 | (2016.01) |
| G06F 12/0875 | (2016.01) |
| G06F 12/0893 | (2016.01) |

(52) U.S. Cl.
CPC ...... *G06F 9/30047* (2013.01); *G06F 9/30018* (2013.01); *G06F 9/30189* (2013.01); *G06F 9/3861* (2013.01); *G06F 9/546* (2013.01); *G06F 12/0868* (2013.01); *G06F 12/0875* (2013.01); *G06F 12/0893* (2013.01)

(58) Field of Classification Search
CPC .................................................... G06F 9/30047
USPC ........................................................ 711/125
See application file for complete search history.

(56) References Cited

U.S. PATENT DOCUMENTS

| | | | |
|---|---|---|---|
| 6,532,531 B1 | 3/2003 | O'Connor | |
| 7,383,403 B1 | 6/2008 | Barreh | |
| 2005/0102474 A1 | 5/2005 | Lakshmanamurthy et al. | |
| 2018/0232311 A1* | 8/2018 | Bhati | .................. G06F 12/0897 |

FOREIGN PATENT DOCUMENTS

| | | |
|---|---|---|
| JP | H-0981458 A | 3/1997 |
| JP | 2007510989 A | 4/2007 |

* cited by examiner

*Primary Examiner* — Jae U Yu
(74) *Attorney, Agent, or Firm* — Nixon Peabody LLP

(57) ABSTRACT

A caching device, an instruction cache, a system for processing an instruction, a method and apparatus for processing data and a medium are provided. The caching device includes a first queue, a second queue, a write port group, a read port, a first pop-up port, a second pop-up port and a press-in port. The is configured to write cache data into a set storage address in the first queue and/or the second queue; the read port is configured to read all cache data from the first queue and/or the second queue at one time; the press-in port is configured to press cache data into the first queue and/or the second queue; the first pop-up port is configured to pop up cache data from the first queue; and the second pop-up port is configured to pop up cache data from the second queue.

18 Claims, 4 Drawing Sheets

CACHING DEVICE, CACHE, SYSTEM, METHOD AND APPARATUS FOR PROCESSING DATA, AND MEDIUM

CROSS-REFERENCE TO RELATED APPLICATIONS

This application claims priority to Chinese Patent Application No. 202010130183.4, filed with the China National Intellectual Property Administration (CNIPA) on Feb. 28, 2020, the contents of which are incorporated herein by reference in their entirety.

TECHNICAL FIELD

The present disclosure relates to the field of computer hardware, particularly to the cloud computing technology, and specifically to a caching device, an instruction cache, a system for processing an instruction, a method and apparatus for processing data and a medium.

BACKGROUND

A core in a multi-core processor acquires instruction processing from an external instruction storage device via an instruction cache (icache). The icache is connected to the external instruction storage device via a bus. The bus responds to a read operation issued by the icache with a random delay, and the icache can initiate a new read operation only after the bus responds to the current read operation. Within the delay time, the situation of that a instruction fetch of the core misses at the icache may occur, which require to cache a read operation not initiated yet.

In the existing technology, a FIFO (First Input First Output) storage device is generally used to cache a missing instruction identifier not initiated in the icache, and another FIFO is used to cache a missing instruction identifier responded but not written back by the bus. Currently, a register set is mainly used to synchronously cache a missing instruction identifier that is initiated, responded but not written back by the bus. When a next missing of instruction fetch occurs, whether a request for a corresponding instruction fetch needs to be initiated is ascertained by querying the missing instruction identifier cached in the register set. At the same time, another register set is used to record cores in which the missing of instruction fetch occurs. When written back via the bus, corresponding instructions may be written back into the cores accordingly.

In the process of implementing the present disclosure, the inventor finds that the existing technology has the following defects: in order to realize the function of fetching a missing instruction, many FIFOs and register sets need to be used, resulting in cumbersome control; in addition, repeated information is cached in the FIFOs and the register sets, thereby causing unnecessary resource waste.

SUMMARY

Embodiments of the present disclosure provide a caching device, a cache, system for processing an instruction, method for processing data, apparatus and medium. By designing a caching device that has a new structure, the hardware cost required for implementing the function fetching a missing instruction is reduced.

In a first aspect, some embodiments of the present disclosure provide a caching device, the caching device includes: a first queue, a second queue, a write port group, a read port, a first pop-up port, a second pop-up port and a press-in port;

the write port group is configured to write cache data into a set storage address in the first queue and/or the second queue;

the read port is configured to read all cache data from the first queue and/or the second queue at one time;

the press-in port is configured to press cache data into the first queue and/or the second queue;

the first pop-up port is configured to pop up cache data from the first queue;

the second pop-up port is configured to pop up cache data from the second queue.

An embodiment of the present disclosure has following advantages and beneficial effects: by setting the pop-up ports for the two queues, when missing of instructions occurs, the caching device may simultaneously store a missing instruction identifier that has not been initiated and a missing instruction identifier that has been responded to but not written back by the bus, thereby greatly saving the number of the caching devices. In addition, by setting the write port group and the read port, the core identifier of the processing core matching the instruction fetch missing identifier may be cached using the same structure, without using the register set to store the above information, thereby reducing the complex logic control.

Alternatively, the write port group comprises a write data port and a write address port;

the write data port is configured to receive written cache data; and the write address port is configured to receive a storage address in the first queue and/or the second queue, the cache data written by the write data port being to be written to the address.

An embodiment of the present disclosure has following advantages and beneficial effects: by setting the write data port and the write address port, and then when requests for instruction fetch targeting at the same missing instruction are received from different processing cores of the multi-core processor, the information of the processing cores may be written to the same storage address, and thus, the limited storage space is multiplexed to the greatest extent, and the processing performance may be improved.

Alternatively, the write port group further comprises a write mask port, the write mask port is configured to receive mask information of the cache data written by the write data port; and the mask information is configured to indicate a data bit of the cache data written to the storage address, and a bit width of the write mask port is identical to a bit width of the write data port.

An embodiment of the present disclosure has following advantages and beneficial effects: by setting the write mask port, it may be accurately set that the corresponding cache data is written to a specific data bit in the storage address of the caching device, and then, that the identifier information of the processing core sending the request for instruction fetch targeting at the missing instruction is updated and stored, and thus, the limited storage space is multiplexed to the greatest extent, and the processing performance may be improved.

Alternatively, the caching device includes a first empty-full state flag bit group and a second empty-full state flag bit group, the first empty-full state flag bit group is configured to indicate a storage state of cache data in the first queue, and the second empty-full state flag bit group is configured to indicate a storage state of cache data in the second queue.

An embodiment of the present disclosure has following advantages and beneficial effects: by setting the first empty-full state flag bit group and the second empty-full state flag bit group, the functions of the caching device may be further enriched, and the storage state of each queue in the caching device may be learned in real time, and thus, processing operations matching different storage states may be performed.

In a second aspect, some embodiments of the present disclosure provide an instruction cache, the instruction cache includes a first caching device and a second caching device according to any one of the embodiments of the present disclosure.

An embodiment of the present disclosure has following advantages and beneficial effects: By setting the first caching device and the second caching device of the above new structure in the instruction cache, the performance of the instruction cache may be further optimized. In particular, in the instruction fetch scenario, the function of fetching a missing instruction that needs to be realized through the cooperation of many FIFOs and many register sets in the existing technology may be realized, thus omitting more complex control logics and simplifying the design of the instruction cache. In addition, that the multi-core processor sends repeated instruction fetch requests to the external instruction storage device, and thus, many unnecessary delays of the multi-core processor may be greatly reduced, thereby improving the performance of the multi-core processor.

In a third aspect, some embodiments of the present disclosure provide a system for processing an instruction, the system includes an instruction cache according to any one of the embodiments of the present disclosure, a multi-core processor and an external instruction storage device.

where the instruction cache is respectively connected to the external instruction storage device and a plurality of processing cores of the multi-core processor, and the instruction cache is connected to the external instruction storage device via a bus.

Alternatively, the multi-core processor is configured to provide, when missing of an instruction fetch occurs, a missing instruction identifier to the instruction cache;

the external instruction storage device is used to store instructions; and the instruction cache is configured to send the missing instruction identifier to the external instruction storage device and acquire an instruction responded and written back by the external instruction storage device via the bus.

Alternatively, the first caching device is configured to cache, using a first queue, an instruction fetch missing identifier that has not been responded by the external instruction storage device when the instruction fetch missing occurs, and cache, using a second queue, an missing instruction fetch identifier that has been responded but has not written back by the external instruction storage device; and the second caching device is configured to correspondingly store, using a first queue or a second queue and based on a storage address of the missing instruction fetch identifier in the first caching device, a core identifier of a processing core matching the missing instruction fetch identifier.

An embodiment of the present disclosure has following advantages and beneficial effects: by setting the first caching device and the second caching device of the new structure in the instruction cache, the function of fetching a missing instruction that needs to be realized through the cooperation of many FIFOs and many register sets in the existing technology may be realized in the system for processing an instruction, thus omitting more complex control logics and simplifying the design of the instruction cache. In addition, the situation that the multi-core processor sends repeated instruction fetch requests to the external instruction storage device may be avoided, and thus, many unnecessary delays of the multi-core processor may be greatly reduced, thereby improving the performance of the multi-core processor.

In a fourth aspect, some embodiments of the present disclosure provide a method for processing data, performed by the instruction cache in the system according to any one of the embodiments of the present disclosure. The method includes:

in response to detecting that an external instruction storage device is in an idle state, fetching a missing instruction identifier from a first queue of a first caching device, and popping up the missing instruction identifier via a first pop-up port, to provide to the external instruction storage device;

in response to detecting a write-back instruction fed back by the external instruction storage device targeting at a first target missing instruction identifier, fetching the first target missing instruction identifier from a second queue of the first caching device, and popping up the first target missing instruction identifier via a second pop-up port of the first caching device;

fetching first target cache data matching the first target missing instruction identifier from a second caching device, and popping up the first target cache data through a first pop-up port or a second pop-up port of the second caching device; and identifying, based on the first target cache data, a first target core identifier of a first target processing core matching the first target missing instruction identifier, and sending the write-back instruction to the first target processing core.

An embodiment of the present disclosure has following advantages and beneficial effects: through the two queues set in the first caching device and the pop-up ports for the different queues, pop-up processing may be respectively performed on an instruction missing identifier that has not been initiated and an instruction missing identifier that has been responded to but has not been written back by the bus, thereby greatly saving the number of the caching devices used by the instruction cache. In addition, the core identifier of the processing core matching the instruction fetch missing identifier may be synchronously popped up through the pop-up ports in the second caching device, without using a register set to store the above information, thereby reducing the complex logic control.

Alternatively, the method further includes:

in response to detecting that missing of an instruction fetch targeting at a second target missing instruction identifier occurs in a second target processing core, reading all missing instruction identifiers stored in the first queue and the second queue from a read port of the first caching device;

in response to the first queue and the second queue of the first caching device not storing the second target missing instruction identifier, simultaneously storing the second target missing instruction identifier into the first queue and the second queue;

generating second target cache data based on the second target processing core and mapping relationships between preset processing cores and a corresponding data bits in cache data; and pressing the second target cache data into a first queue or a second queue of the second caching device through a press-in port of the second caching device.

An embodiment of the present disclosure has following advantages and beneficial effects: by setting the first caching device in the instruction cache, when missing of an instruction occurs, the missing instruction identifier that has not been initiated and the instruction missing identifier that has been responded to but has not been written back by the bus may be simultaneously stored, thereby greatly saving the number of the caching devices. In addition, through the write port group and the read port in the second caching device, the core identifier of the processing core matching the instruction fetch missing identifier may be synchronously cached or read, without using the register set to store the above information, thereby reducing the complex logic control.

Alternatively, after the reading all missing instruction identifiers stored in the first queue and the second queue from the read port of the first caching device, the method further includes:

in response to the first queue or the second queue of the first caching device storing the second target missing instruction identifier, fetching a target storage address of the second target missing instruction identifier in the first caching device;

generating third target cache data and target mask information based on the second target processing core and the mapping relationships between the preset processing cores and the corresponding data bits in the cache data; and writing the target storage address, the third target cache data and the target mask information through a write port group of the second caching device, to store, in the second caching device, a core identifier of the second target processing core matching the second target missing instruction identifier.

An embodiment of the present disclosure has following advantages and beneficial effects: through the write port group in the second caching device, it may be implemented that, when the instruction fetch requests of different processing cores in the multi-core processor targeting at an identical missing instruction are received, the information of the processing cores is written to the same storage address, and thus, the limited storage space is multiplexed to the greatest extent, and the processing performance may be improved. In addition, that the multi-core processor sends repeated instruction fetch requests to the external instruction storage device may be avoided, and thus, many unnecessary delays of the multi-core processor may be greatly reduced, thereby improving the performance of the multi-core processor.

Alternatively, the method further includes at least one of the following:

in response to there being no cache data in the first queue of the first caching device, setting an empty state flag bit in a first empty-full state flag bit group of the first caching device to a target level value;

in response to the first queue of the first caching device is full, setting a full state flag bit in the first empty-full state flag bit group of the first caching device to a target level value;

in response to there being no cache data in the second queue of the first caching device, setting an empty state flag bit in a second empty-full state flag bit group of the first caching device to a target level value; or in response to the second queue of the first caching device is full, setting a full state flag bit in the second empty-full state flag bit group of the first caching device to a target level value.

Alternatively, the method further includes: in response to detecting the full state flag bit in the first empty-full state flag bit group or the second empty-full state flag bit group of the first caching device is the target level value, receiving no more instruction fetch requests from any one of processing cores in a multi-core processor.

In a fifth aspect, some embodiments of the present disclosure provide an apparatus for processing data, implemented by the instruction cache in the system according to any one of the embodiments of the present disclosure. The apparatus includes: a first pop-up processing module, configured to fetch, in response to detecting that an external instruction storage device is in an idle state, a missing instruction identifier from a first queue of a first caching device, and popping up the missing instruction identifier via a first pop-up port, to provide to the external instruction storage device;

a second pop-up processing module, configured to fetch, in response to detecting a write-back instruction fed back by the external instruction storage device targeting at a first target missing instruction identifier, the first target missing instruction identifier from a second queue of the first caching device, and popping up the first target missing instruction identifier via a second pop-up port of the first caching device;

a third pop-up processing module, configured to fetch first target cache data matching the first target missing instruction identifier from a second caching device, and popping up the first target cache data through a first pop-up port or a second pop-up port of the second caching device; and a write-back instruction sending module, configured to identify based on the first target cache data, a first target core identifier of a first target processing core matching the first target missing instruction identifier, and sending the write-back instruction to the first target processing core.

An embodiment of the present disclosure has following advantages and beneficial effects: through the two queues set in the first caching device and the pop-up ports for the different queues, pop-up processing may be respectively performed on an instruction missing identifier that has not been initiated and an instruction missing identifier that has been responded to but has not been written back by the bus, thereby greatly saving the number of the caching devices used by the instruction cache. In addition, the core identifier of the processing core matching the instruction fetch missing identifier may be synchronously popped up through the pop-up ports in the second caching device, without using a register set to store the above information, thereby reducing the complex logic control.

In a sixth aspect, some embodiments of the present disclosure provide non-transitory computer readable storage medium, storing a computer instruction, wherein the computer instruction is used to cause a computer to perform the method according to any one of the embodiments of the present disclosure.

An embodiment of the present disclosure has following advantage and beneficial effects: through the two queues set in the first caching device and the pop-up ports for the different queues, pop-up processing may be respectively performed on an instruction missing identifier that has not been initiated and an instruction missing identifier that has been responded to but has not been written back by the bus, thereby greatly saving the number of the caching devices used by the instruction cache. In addition, the core identifier of the processing core matching the instruction fetch missing identifier may be synchronously popped up through the pop-up ports in the second caching device, without using a register set to store the above information, thereby reducing the complex logic control.

Other effects of the above-mentioned optional manners will be embodied in some aspects in combination with specific embodiments.

BRIEF DESCRIPTION OF THE DRAWINGS

Accompanying drawings are used for a better understanding of the scheme, and do not constitute a limitation to the present disclosure. Here.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

First Embodiment

Figure 1:
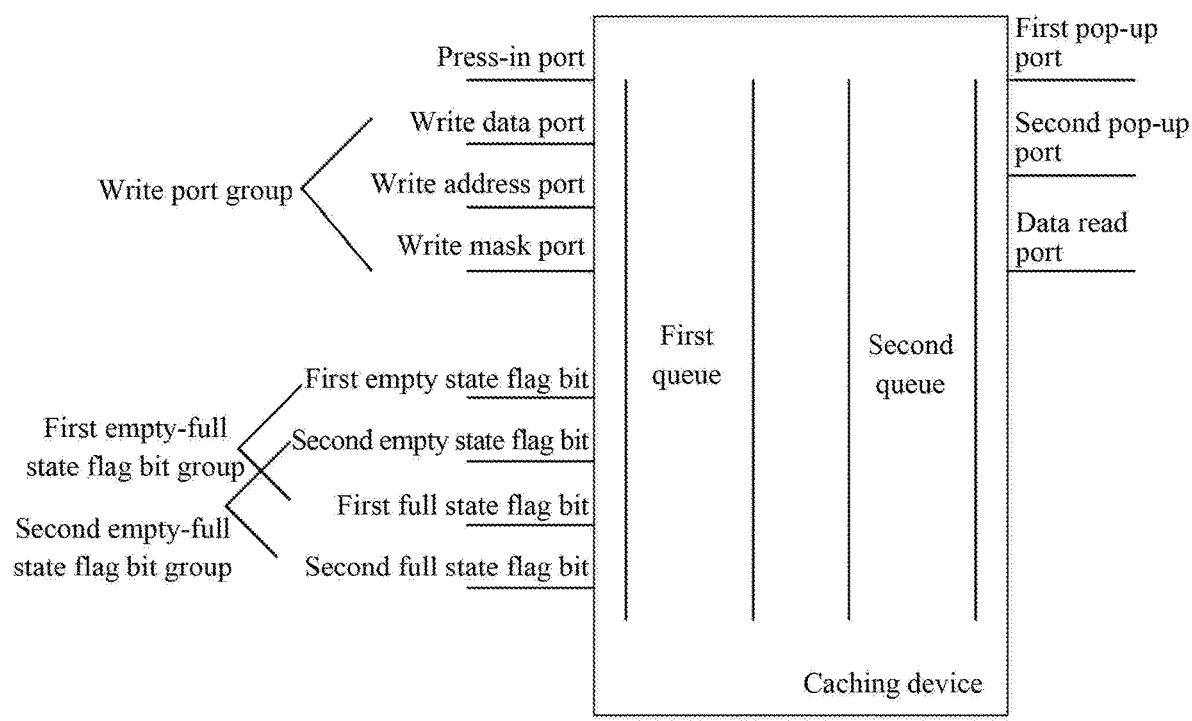
FIG. 1 is a schematic structural diagram of a caching device provided in a first embodiment of the present disclosure.

FIG. 1 is a schematic structural diagram of a caching device provided in a first embodiment of the present disclosure. The caching device provided in this embodiment may be applied to an instruction cache, and store information such as an instruction fetch missing identifier not responded by a bus when the missing of an instruction fetch occurs, an instruction fetch missing identifier responded but not written back by the bus, and core identifiers of processing cores matching the instruction fetch missing identifiers.

As shown in FIG. 1, the caching device may include a first queue, a second queue, a write port group, a read port, a first pop-up port, a second pop-up port and a press-in port.

The write port group is configured to write cache data into a set storage address in the first queue and/or the second queue.

The read port is configured to read all cache data from the first queue and/or the second queue at one time.

The press-in port is configured to press cache data into the first queue and/or the second queue.

The first pop-up port is configured to pop up cache data from the first queue.

The second pop-up port is configured to pop up cache data from the second queue.

In an embodiment, the first queue and the second queue are similar to existing FIFO storage devices, and are first-in first-out queues, and may implement the basic functions of the existing FIFO storage devices. Here, the purpose of setting the two queues lies in that, one caching device may be used to simultaneously store: an instruction fetch missing identifier that has not been responded by a bus when a missing of the instruction fetch occurs, and an instruction fetch missing identifier that has been responded but has not been written back yet by the bus, so as to further reduce the use of a storage device.

Here, the instruction fetch missing identifier may be the identifier information (also referred to as identity identification information) of an instruction in which the missing of the instruction fetch occurs. Generally, the icache marks an instruction through a pc (program counter), the pc recording the relative address of the instruction in an external instruction storage device. Accordingly, the instruction fetch missing identifier may be the pc corresponding to the instruction in which the missing of the instruction fetch occurs.

Here, the reason to set a press-in port lies in that, when missing of an instruction fetch occurs, the missing instruction identifier corresponding to the missing of the instruction fetch simultaneously satisfies: that the identifier has not been responded by the bus when the missing of instruction fetch occurs, and that the identifier has been responded but not written back by the bus. Therefore, the missing instruction identifier may be pressed into the first queue and the second queue at the same time through the press-in port. Typically, the first queue may be used to store the instruction fetch missing identifier that has not been responded by the bus when the missing of the instruction fetch occurs, and the second queue may be used to store the instruction fetch missing identifier that has been responded but not written back by the bus.

The reason to set two pop-up ports lies in that, when that the external instruction storage device is in an idle state is detected, the instruction fetch missing identifier that has not been responded by the bus when the missing of the instruction fetch occurs may be acquired from the first queue, and the above instruction fetch missing identifier is popped up from the first pop-up port, to be provided to the external instruction storage device to perform a corresponding instruction write-back operation. Since the external instruction storage device can process only one instruction read operation at a given time, when it is detected that the external instruction storage device feeds back a write-back instruction, it indicates that the first instruction fetch missing identifier, which has been responded to but not written back by the bus and is currently stored in the second queue, receives the corresponding write-back instruction, and thus, the first instruction fetch missing identifier in the second queue may be popped up via the second pop-up port, to release the cache space.

Through the two pop-up ports of the one caching device, the functions of two FIFOs in the existing function of fetching the missing instruction may be satisfied, to save the number of the caching devices, and thus the size of the entire instruction cache may be reduced.

Further, by using the write port group, the core identifier of a processing core matching the instruction fetch missing identifier may be synchronously written into a first queue or a second queue of a new caching device. Then, when the write-back instruction fed back by the external instruction cache is received, at the same time as popping up the first instruction fetch missing identifier stored in the second queue of a caching device through the second pop-up port, the core identifier of the processing core, which is matching the instruction fetch missing identifier and cached in the first queue or the second queue of the second caching device, may be synchronously popped up through the first pop-up port or the second pop-up port, to determine a processing core to which the write-back instruction is provided, without using a register set to store the above information, thus reducing the complex logic control.

Further, by reading all of the cache data from the first queue and/or the second queue at one time using the read port, it may be implemented that, when anew instruction fetch missing identifier sent by the processing core is received, whether the instruction fetch missing identifier has been previously sent by one another processing core is quickly identified, without introducing a new register set to repeatedly store the above information, thereby further reducing the complex logic control.

It can be seen from the above analysis that, by using the caching device of the above new structure, on the basis of reducing the hardware cost to the greatest extent, the existing function of fetching the missing instruction may be effectively realized.

According to the technical solution of embodiments of the present disclosure, by setting the pop-up ports for the two queues, when missing of instructions occurs, the caching device may simultaneously store a missing instruction identifier that has not been initiated and a missing instruction identifier that has been responded to but not written back by the bus, thereby greatly saving the number of the caching devices. In addition, by setting the write port group and the read port, the core identifier of the processing core matching the instruction fetch missing identifier may be cached using the same structure, without using the register set to store the above information, thereby reducing the complex logic control.

On the basis of the above embodiments, the write port group may include a write data port and a write address port.

The write data port is used to receive the written cache data.

The write address port is used to receive a storage address in the first queue and/or the second queue, the cache data written by the write data port being to be written to the address.

Here, in the first queue or the second queue, different storage spaces correspond to different storage addresses. By setting the write port group, cache data written at a certain storage address (the certain storage address has been written with cache data) in the first queue or the second queue may be modified, such that it may be implemented that, when missing of instruction fetch targeting at the same instruction occurs in a plurality of processing cores in the multi-core processor, it is not required to use, for different processing cores, a plurality of storage addresses to store the same instruction fetch missing identifier for many times. It is only required to update a stored core identifier of a processing core matching the instruction fetch missing identifier and store the core identifier.

In a specific example, a set of binary data matching the number of the processing cores of the multi-core processor is used to represent the processing cores. For example, if the number of the processing cores is 12, a set of 12-bit data may be used to represent the 12 processing cores at the same time, and a different processing core corresponds to a different data bit of the 12-bit data.

For example, the first data bit corresponds to the processing core A, the second data bit corresponds to the processing core B, the third data bit corresponds to the processing core C, and so on. When the instruction cache receives an identifier of a missing instruction sent by the processing core A, a group of data 100000000000 may be correspondingly constructed to be pressed into a storage address (e.g., storage address X) of a caching device with the above structure through the press-in port. When the instruction cache receives an identical instruction missing identifier sent by the processing core C again, it is not required to repeatedly store the instruction missing identifier at a new storage address for the processing core C, it is only required to update the data stored at the storage address X from 100000000000 to 101000000000, and thus it may be represented that the missing of the instruction targeting at the above instruction missing identifier occurs simultaneously in the processing core A and the processing core C.

Typically, the above desired processing result may be obtained by reading and writing the cache data written by the write port and the cache data currently stored at the corresponding storage address.

The advantage of this setting lies in that, the required cache data may be written at the set storage address of the first queue or the second queue by setting the write data port and the write address port, and then when requests for instruction fetch targeting at the same missing instruction are received from different processing cores of the multi-core processor, the information of the processing cores may be written to the same storage address, and thus, the limited storage space is multiplexed to the greatest extent, and the processing performance may be improved.

On the basis of the above embodiments, the write port group may further include a write mask port.

The write mask port is used to receive mask information of the cache data written from the write data port.

The mask information is used to indicate a data bit of the cache data written to the storage address, and a bit width of the write mask port is identical to a bit width of the write data port.

For the application scenario as described in the above example, when it is required to update the data stored at the storage address X from 100000000000 to 101000000000, it is only required to modify the third bit of the cache data from 0 to 1. Therefore, the internal write logic in the caching device is further simplified. The write mask port may be introduced into the write port group, and the mask information written by the write mask port ascertains which data bit in the cache data written into the write port needs to be written to the corresponding storage address.

As described above, if it is desired to write 1 into the third data bit of the cache data at the storage address X, mask information in a form such as 001000000000 and cache data in a form such as 001000000000 may be set, and the third bit high level 1 inputted from the mask information indicates that the third bit 1 of the cache data is written to the corresponding storage address.

The advantage of this setting lies in that, by setting the write mask port, it may be accurately set that the corresponding cache data is written to a specific data bit in the storage address of the caching device, and then, that the identifier information of the processing core sending the request for instruction fetch targeting at the missing instruction is updated and stored, and thus, the limited storage space is multiplexed to the greatest extent, and the processing performance may be improved.

On the basis of the above embodiments, the caching device may further include a first empty-full state flag bit group and a second empty-full state flag bit group.

The first empty-full state flag bit group is used to indicate a storage state of cache data in the first queue.

The second empty-full state flag bit group is used to indicate a storage state of cache data in the second queue.

Here, the first empty-full state flag bit group may include a first empty state flag bit and a first full state flag bit. Here, the first empty state flag bit is set to a target level value (typically, the high level 1) when no cache data is stored in the first queue, to be used to indicate an empty storage state of the first queue. The first full state flag bit is set to a target level value when the storage space of the first queue is full of cache data, to be used to indicate a full storage state of the first queue.

Similarly, the second empty-full state flag bit group may include a second empty state flag bit and a second full state flag bit. Here, the second empty state flag bit is set to a target level value (typically, the high level 1) when no cache data is stored in the second queue, to be used to indicate an empty storage state of the second queue. The second full state flag bit is set to a target level value when the storage space of the second queue is full of cache data, to be used to indicate a full storage state of the second queue.

The advantage of this setting lies in that, by setting the first empty-full state flag bit group and the second empty-full state flag bit group, the functions of the caching device may be further enriched, and the storage state of each queue in the caching device may be learned in real time, and thus, processing operations matching different storage states may be performed.

Second Embodiment

Figure 2:
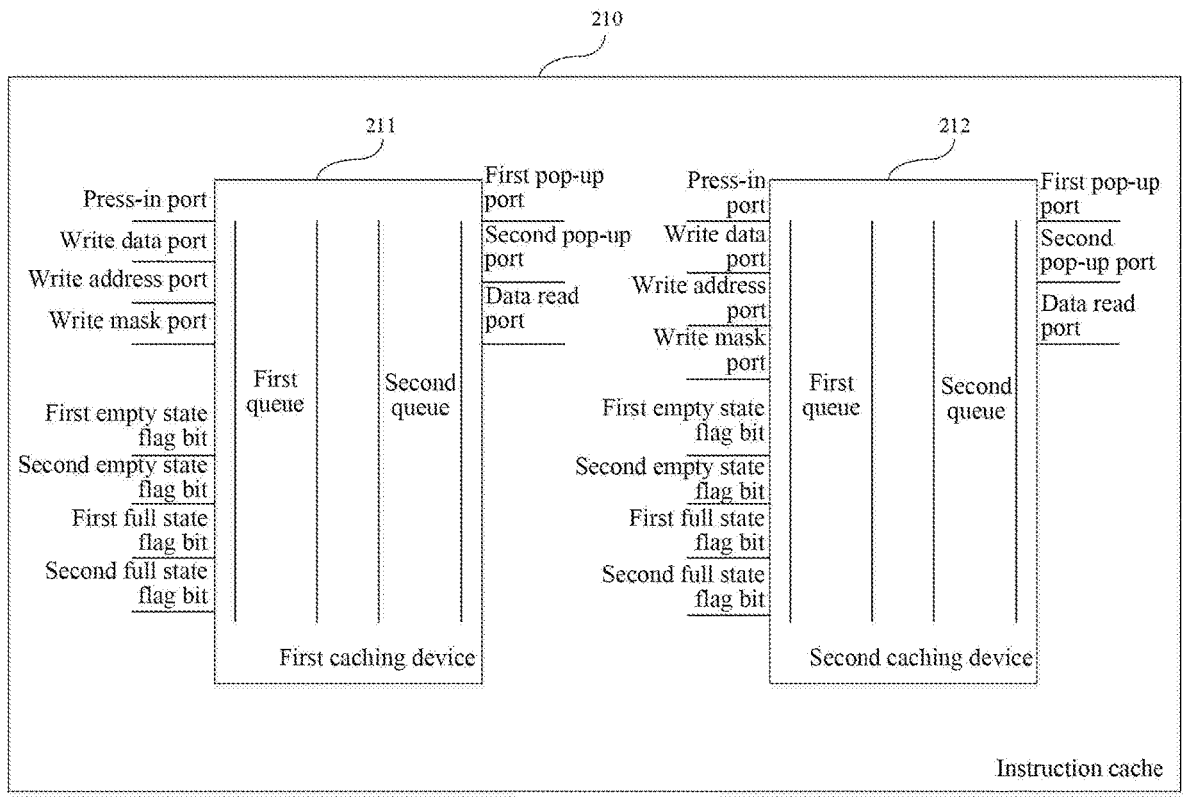
FIG. 2 is a schematic structural diagram of an instruction cache provided in a second embodiment of the present disclosure.

FIG. 2 is a schematic structural diagram of an instruction cache provided in a second embodiment of the present disclosure. The instruction cache provided in this embodiment uses two caching devices as provided by embodiments of the present disclosure.

As shown in FIG. 2, the instruction cache 210 includes a first caching device 211 and a second caching device 212.

Here, the first caching device 211 and the second caching device 212 have the same structure as the caching device described in any embodiment of the present disclosure.

In an embodiment, each of the first caching device and the second caching device includes a first queue, a second queue, a write port group, a read port, a first pop-up port, a second pop-up port and a press-in port.

The write port group is used to write cache data into a set storage address in the first queue and/or the second queue.

The read port is used to read all cache data from the first queue and/or the second queue at one time.

The press-in port is used to press cache data into the first queue and/or the second queue.

The first pop-up port is used to pop up cache data from the first queue.

The second pop-up port is used to pop up cache data from the second queue.

The write port group may include a write data port and a write address port.

The write data port is used to receive the written cache data.

The write address port is used to receive a storage address in the first queue and/or the second queue, the cache data written by the write data port being to be written to the address.

The write port group may further include a write mask port.

The write mask port is used to receive mask information of the cache data written through the write address port.

The mask information is used to indicate a data bit of the cache data written to the storage address, and a bit width of the write mask port is identical to a bit width of the write data port.

The caching device may further include a first empty-full state flag bit group and a second empty-full state flag bit group.

The first empty-full state flag bit group is used to indicate a storage state of the cache data in the first queue.

The second empty-full state flag bit group is used to indicate a storage state of the cache data in the second queue.

Here, the first empty-full state flag bit group includes a first empty state flag bit and a first full state flag bit. The second empty-full state flag bit group includes a second empty state flag bit and a second full state flag bit.

By setting the first caching device and the second caching device of the above new structure in the instruction cache, the performance of the instruction cache may be further optimized. In particular, in the instruction fetch scenario, the function of fetching a missing instruction that needs to be realized through the cooperation of many FIFOs and many register sets in the existing technology may be realized, thus omitting more complex control logics and simplifying the design of the instruction cache. In addition, that the multi-core processor sends repeated instruction fetch requests to the external instruction storage device, and thus, many unnecessary delays of the multi-core processor may be greatly reduced, thereby improving the performance of the multi-core processor.

Third Embodiment

Figure 3:
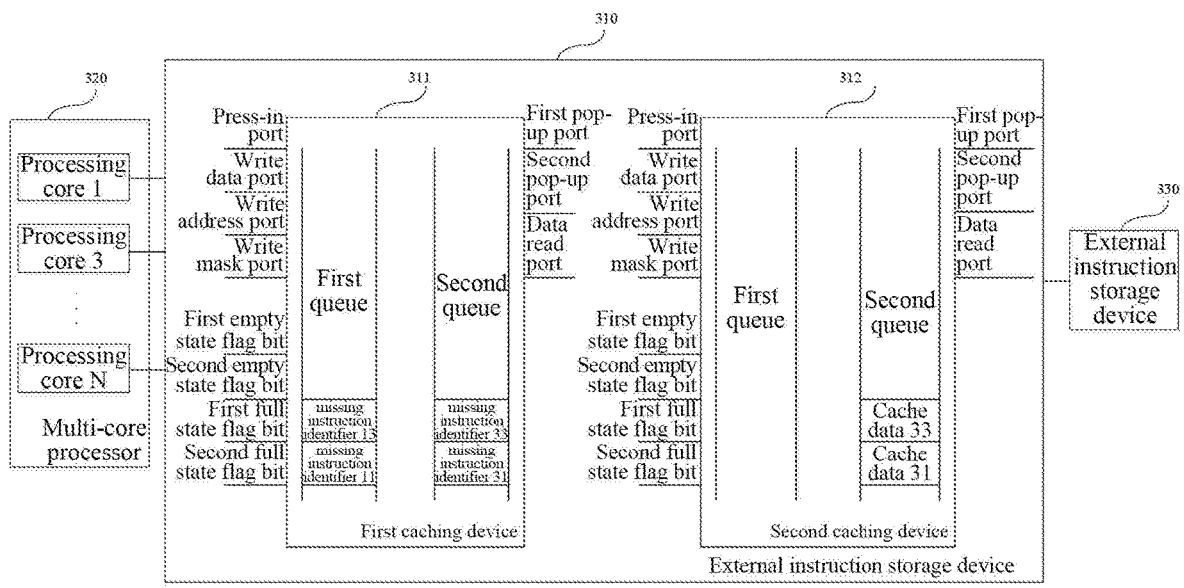
FIG. 3 is a schematic structural diagram of a system for processing an instruction provided in a third embodiment of the present disclosure.

FIG. 3 is a schematic structural diagram of a system for processing an instruction provided in a third embodiment of the present disclosure. By using the instruction cache as described in any embodiment of the present disclosure, and by using the instruction cache as a bridge between a multi-core processor and an external instruction storage device, it may be implemented that, when the missing of an instruction fetch occurs in one or more processing cores in the multi-core processor, a corresponding missing instruction identifier and core identifiers of the processing cores in which the missing of the instruction fetch occurs are cached, to realize a function of fetching a missing instruction.

As shown in FIG. 3, the system for processing an instruction includes an instruction cache 310 as described in any embodiment of the present disclosure, a multi-core processor 320 and an external instruction storage device 330. The instruction cache 310 may include a first caching device 311 and a second caching device 312 as described in any embodiment of the present disclosure.

The instruction cache 310 is respectively connected to a plurality of processing cores (processing core 1, processing core 2, . . . processing core N as illustrated in FIG. 3) of the multi-core processor 320 and the external instruction storage device 330, and the instruction cache 310 is connected to the external instruction storage device 330 via a bus.

The multi-core processor 320 is used to provide, when missing of an instruction fetch occurs, an identifier indicating an instruction being missing to the instruction cache.

The external instruction storage device 330 is used to store an instruction.

The instruction cache 310 is used to send the missing instruction identifier to the external instruction storage device 330 and acquire an instruction responded to and written back by the external instruction storage device 330 via the bus.

Alternatively, the first caching device 311 is used to cache, using a first queue, an instruction fetch missing that has not been responded to by the external instruction storage device when the instruction fetch miss occurs, and cache, using a second queue, an instruction fetch missing identifier that has been responded but not written back by the external instruction storage device.

The second caching device 312 is used to correspondingly store, using a first queue or a second queue and based on a storage address of the missing instruction fetch identifier in the first caching device, a core identifier of a processing core matching the missing instruction fetch identifier.

Here, when the processing core needs an instruction fetch to perform processing, an instruction is requested from the external instruction storage device 330 through the instruction cache 310. When responding to the instruction acquisition request via the bus, the external instruction storage device 330 would write an instruction matching the instruction acquisition request back to the instruction cache 310 via the bus. The instruction is provided by the instruction cache 310 to the processing core issuing the instruction acquisition request. The instruction cache 310 can only respond to the same instruction acquisition request at one time, and other instruction acquisition requests are randomly delayed. When detecting missing of an instruction fetch occurs, the processing core provides the instruction fetch missing identifier matching the missing instruction fetch to the instruction cache 310 for caching, and the instruction cache 310 acquires the missing instruction at an appropriate time, and feeds back the missing instruction to the matching processing core.

Here, in order to cooperate with the use of the first caching device 311, the second caching device 312 only uses one queue, which is an example but not a limitation. The core identifier of the processing core matching the instruction fetch missing identifier may be stored by only using the second queue in the second caching device 312. Correspondingly, when reading the cache data from the read port of the second caching device 312 is required, the cache data is only read from the second queue. When writing the cache data from the write port group of the second caching device 312 is required, the data can only be written to a set data bit in the data cached at the set storage address in the second queue. When pressing cache data through the press-in port of the second caching device 312 is required, the pressed cache data is only pressed into the second queue. When popping up cache data from the second queue of the second caching device 312 is required, the cache data can only be popped up through the second pop-up port. At the same time, the empty-full storage state of the second queue is indicated by only using the second empty-full state flag bit group in the second caching device 312.

It may be understood that the core identifier of the processing core matching the instruction fetch missing identifier may also be stored using the first queue in the second caching device 312, which is not limited in this embodiment.

In an embodiment, when the external instruction storage device 330 being in an idle state is detected, the instruction cache 310:

fetches an missing instruction identifier from the first queue of the first caching device 311, and pops up the missing instruction identifier through the first pop-up port, to be provided to the external instruction storage device 330.

When detecting a write-back instruction fed back by the external instruction storage device 330 targeting at a first target missing instruction identifier, the instruction cache 310 performs:

fetching the first target missing instruction identifier from the second queue of the first caching device 311, and popping up the first target missing instruction identifier through the second pop-up port of the first caching device 311;

fetching first target cache data matching the first target missing instruction identifier from the second caching device 312, and popping up the first target cache data through the first pop-up port or the second pop-up port of the second caching device 312; and identifying a first target core identifier of a first target processing core matching the first target missing instruction based on the first target cache data, and sending the write-back instruction to the first target processing core.

When occurrence of missing of a second target missing instruction identifier in a second target processing core is detected, the instruction cache 310 performs:

reading all of the missing instruction identifiers stored in the first queue and the second queue from the read port of the first caching device;

if the first queue and the second queue of the first caching device do not store the second target missing instruction identifier, simultaneously storing the second target missing instruction identifier into the first queue and the second queue; generating second target cache data based on the second target processing core and preset mapping relationships between processing cores and corresponding data bits in cache data; and pressing the second target cache data into the first queue or the second queue of the second caching device through the press-in port of the second caching device;

if the first queue or the second queue of the first caching device stores the second target missing instruction identifier, acquiring a target storage address of the second target missing instruction identifier in the first caching device;

generating third target cache data and target mask information based on the second target processing core and the preset mapping relationships between the processing cores and the corresponding data bits in the cache data; and writing, through the write port group of the second caching device, the target storage address, the third target cache data and the target mask information, to store, in the second caching device, a core identifier of the second target processing core matching a second target missing instruction identifier.

According to the technical solution of embodiments of the present disclosure, by setting the first caching device and the second caching device of the new structure in the instruction cache, the function of fetching a missing instruction that needs to be realized through the cooperation of many FIFOs and many register sets in the existing technology may be realized in the system for processing an instruction, thus omitting more complex control logics and simplifying the design of the instruction cache. In addition, the situation that the multi-core processor sends repeated instruction fetch requests to the external instruction storage device may be avoided, and thus, many unnecessary delays of the multi-core processor may be greatly reduced, thereby improving the performance of the multi-core processor.

Fourth Embodiment

Figure 4:
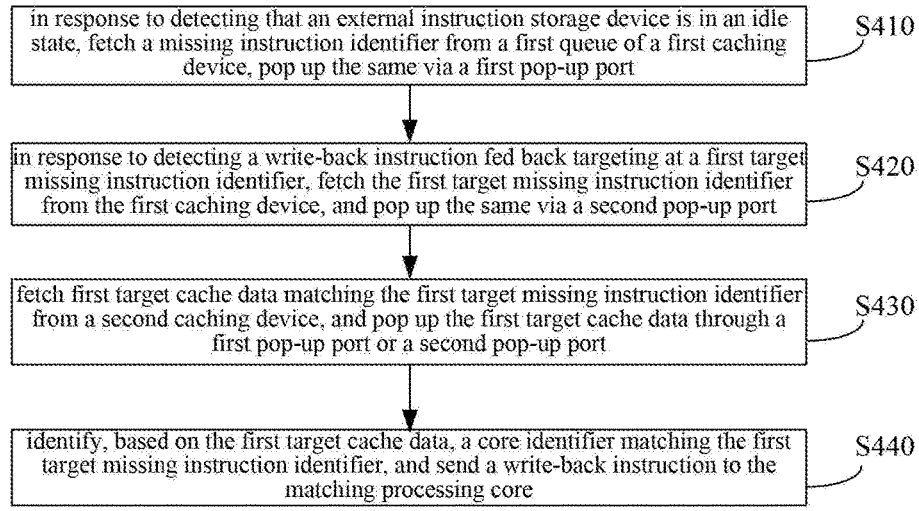
FIG. 4 is a flowchart of an implementation of a method for processing data provided in a fourth embodiment of the present disclosure.

FIG. 4 is a schematic flowchart of a method for processing data provided in a fourth embodiment of the present disclosure. This embodiment may be applicable to a situation where processing for a missing instruction is implemented. The method may be performed by an apparatus for processing data. The apparatus is implemented by means of software and/or hardware, and preferably configured in the instruction cache in the system for processing an instruction as described in any embodiment of the present disclosure. The instruction cache is used in combination with a multi-core processor and an external instruction storage device. As shown in FIG. 4, the method includes the following steps:

S410, in response to detecting that an external instruction storage device is in an idle state, fetching a missing instruction identifier from a first queue of a first caching device, and popping up the missing instruction identifier via a first pop-up port, to provide to the external instruction storage device.

As described above, the first queue of the first caching device caches an instruction fetch missing identifier not responded to by a bus when missing of the instruction fetch occurs, that is, an instruction fetch missing identifier that has not sent to the external instruction storage device. Therefore, when the external instruction storage device being in the idle state is detected, it indicates that the external instruction storage device currently is not performing an instruction read operation, thus the missing instruction identifier may be fetched from the first queue of the first caching device and popped up through the first pop-up port, the instruction missing identifier popped up may be provided to the external instruction storage device, to cause the external instruction storage device to perform write-back operation on the instruction corresponding to the instruction missing identifier.

S420, in response to detecting a write-back instruction fed back by the external instruction storage device targeting at a first target missing instruction identifier, fetching the first target missing instruction identifier from a second queue of the first caching device, and popping up the first target missing instruction identifier via a second pop-up port of the first caching device.

In this embodiment, the second queue of the first caching device caches an instruction fetch missing identifier responded to but not written back by the bus. The instruction fetch missing identifier cached in the second queue is an instruction fetch missing identifier that has been sent to the external instruction storage device via the bus, but has not received a write-back instruction fed back from the external instruction storage device.

Here, since the external instruction storage device can process only one instruction read operation at the same time, when the external instruction storage device feeds back a write-back instruction, it indicates that the first instruction fetch missing identifier responded to but not written back by the bus and stored in the current second queue receives a corresponding write-back instruction, and thus, the first instruction fetch missing identifier in the second queue may be popped up through the second pop-up port, to release the cache space.

S430, fetching first target cache data matching the first target missing instruction identifier from a second caching device, and popping up the first target cache data through a first pop-up port or a second pop-up port of the second caching device.

In this embodiment, when the instruction fetch missing identifier indicating that the missing of instruction fetch occurs is stored by the first caching device, the core identifier of the processing core matching the instruction fetch missing identifier is synchronously written into the second caching device. Then, when the write-back instruction fed back by the external instruction cache is received, at the time of popping up the first instruction fetch missing identifier (i.e., the first target instruction missing identifier) in the second queue of the first caching device through the second pop-up port, the core identifier (i.e., a first target core identifier) of the processing core matching the instruction fetch missing identifier, which is cached in the first queue or the second queue of the second caching device, may be synchronously popped up through the first pop-up port or the second pop-up port, to ascertain processing cores to which the write-back instruction is provided, without using a register set to store the above information, thus reducing the complex logic control.

In an embodiment, the core identifier of the first target core identifier is included in the first target cache data, the number of data bits of the first target cache data matches the number of the processing cores of the multi-core processor, and different processing cores correspond to different data bits of the first target cache data. Based on the specific data values (0, or 1) of data bits in the first target cache data, it is possible to ascertain processing cores in which the missing of instruction fetch targeting at the first target identifier of missing instruction occurs.

S440, identifying, based on the first target cache data, a first target core identifier of a first target processing core matching the first target missing instruction identifier, and sending the write-back instruction to the first target processing core.

In an embodiment, a processing core in which the missing of instruction fetch occurs may be identified through the data value 1, and then the position where 1 appears in the first target cache data may be identified. Then, one or more first target core identifiers are identified according to mapping relationships between data bits and processing cores, and the write-back instruction fed back by the external instruction storage device is provided to the first target processing core.

In this embodiment of the present disclosure, by setting the first caching device in the instruction cache, when missing of an instruction occurs, the missing instruction identifier that has not been initiated and the instruction missing identifier that has been responded to but has not been written back by the bus may be simultaneously stored, thereby greatly saving the number of the caching devices. In addition, through the write port group and the read port in the second caching device, the core identifier of the processing core matching the instruction fetch missing identifier may be synchronously cached or read, without using the register set to store the above information, thereby reducing the complex logic control.

Fifth Embodiment

Figure 5:
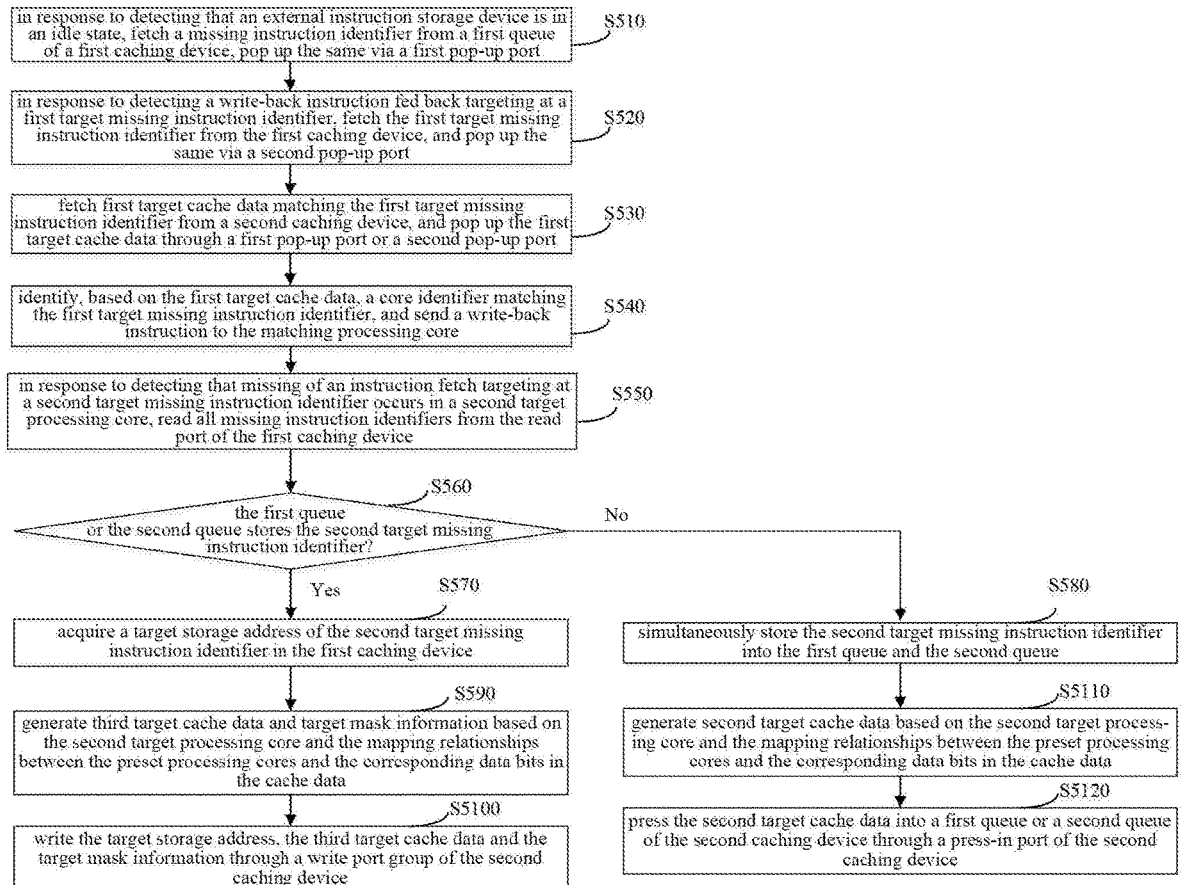
FIG. 5 is a flowchart of an implementation of a method for processing data provided in a fifth embodiment of the present disclosure.

FIG. 5 is a schematic flowchart of a method for processing data provided in a fifth embodiment of the present disclosure. This embodiment is optimized on the basis of the above embodiments. The operation of storing, when missing of an instruction fetch occurs, an missing instruction identifier and a processing core in which the missing of instruction fetch occurs is embodied. As shown in FIG. 5, the method includes:

S510, in response to detecting that an external instruction storage device is in an idle state, fetching a missing instruction identifier from a first queue of a first caching device, and popping up the missing instruction identifier via a first pop-up port, to provide to the external instruction storage device.

S520, in response to detecting a write-back instruction fed back by the external instruction storage device targeting at a first target missing instruction identifier, fetching the first target missing instruction identifier from a second queue of the first caching device, and popping up the first target missing instruction identifier via a second pop-up port of the first caching device.

S530, fetching first target cache data matching the first target missing instruction identifier from a second caching device, and popping up the first target cache data through a first pop-up port or a second pop-up port of the second caching device.

S540, identifying, based on the first target cache data, a first target core identifier of a first target processing core matching the first target missing instruction identifier, and sending the write-back instruction to the first target processing core.

S550, in response to detecting that missing of an instruction fetch targeting at a second target missing instruction identifier occurs in a second target processing core, reading all missing instruction identifiers stored in the first queue and the second queue from a read port of the first caching device.

In this embodiment, since the read port, which may read all the cache data in the first queue and the second queue at one time, is set in the first caching device, therefore, by reading all the cache data from the read port, whether the second target instruction missing identifier is sent by one another processing core in addition to the second target processing core may be directly determined, repeated storage of the same instruction missing identifier.

S560, determining whether the first queue or the second queue of the first caching device stores the second target missing instruction identifier, performing S570 if yes, otherwise, performing S580.

S570, acquiring a target storage address of the second target missing instruction identifier in the first caching device, and performing S590.

If the first queue or the second queue of the first caching device stores the second target missing instruction identifier, it indicates that the second target missing instruction identifier has been sent by other processing core. Therefore, it is only required to additionally store the core identifier of the second target processing core to the target storage address in the second caching device.

It should also be noted that, taking the use of the second queue by the second caching device as an example, there is a one-to-one correspondence between the information stored in the second queue of the second caching device and the second queue of the first caching device. That is, at an identical storage address, the second queue of the first caching device stores a missing instruction identifier A, and the second queue of the second caching device stores the core identifiers of all processing cores sending the missing instruction identifier A.

S580, simultaneously storing the second target missing instruction identifier into the first queue and the second queue.

If the first queue and the second queue of the first caching device do not store the second target missing instruction identifier, it indicates that the second target missing instruction identifier has not been sent by other processing cores. Therefore, the second target missing instruction identifier simultaneously satisfies that the identifier has not been responded to by the bus when the missing of instruction fetch occurs, and that the identifier has been responded to but has not written back by the bus. Therefore, the second target missing instruction identifier may be pressed into the first queue and the second queue of the first caching device at the same time through the press-in port of the first caching device.

Here, in this embodiment, the first queue may be used to store the instruction fetch missing identifier that has not been responded to by the bus when the missing of the instruction occurs, and the second queue may be used to store the instruction fetch missing identifier that has been responded to but has not been written back by the bus.

S590, generating third target cache data and target mask information based on the second target processing core and the mapping relationships between the preset processing cores and the corresponding data bits in the cache data, and performing S5100.

In a specific example, if the multi-core processor includes 12 processing cores, the 12 processing cores correspond to 12 data bits of the cache data stored in the second caching device. Here, according to the mapping relationships between the preset processing cores and the corresponding data bits in the cache data, the second target processing core corresponds to the third bit of the 12 data bits. Therefore, the third target cache data and the target mask information may be constructed in a form such as 001000000000, to ascertain that the third bit in the target storage address is adjusted to 1, and thus, the core identifier of the second target processing core is additionally stored at the target storage address.

S5100, writing the target storage address, the third target cache data and the target mask information through a write port group of the second caching device, to store, in the second caching device, a core identifier of the second target processing core matching the second target missing instruction identifier.

S5110, generating second target cache data based on the second target processing core and mapping relationships between preset processing cores and a corresponding data bits in cache data.

Since the second target missing instruction identifier is not stored in the first caching device, the corresponding second target cache data may be directly generated based on the mapping relationships between the processing cores and the corresponding data bits in the cache data.

In the above example, the second target processing core corresponds to the third bit of the 12 data bits. Therefore, the second target cache data in a form such as 001000000000 may be constructed.

S5120, pressing the second target cache data into a first queue or a second queue of the second caching device through a press-in port of the second caching device.

According to the technical solution in this embodiment of the present disclosure, by setting the first caching device in the instruction cache, when missing of the instruction occurs, the missing instruction identifier that has not been initiated and the missing instruction identifier that has been responded to but has not written back by the bus may be simultaneously stored, thereby greatly saving the number of the caching devices. In addition, through the write port group and the read port in the second caching device, the core identifier of the processing core matching the instruction fetch miss identifier may be synchronously cached or read, without using the register set to store the above information, thereby reducing the complex logic control.

In addition, through the write port group in the second caching device, it may be implemented that, when the instruction fetch requests of different processing cores in the multi-core processor targeting at an identical missing instruction are received, the information of the processing cores is written to the same storage address, and thus, the limited storage space is multiplexed to the greatest extent, and the processing performance may be improved. In addition, that the multi-core processor sends repeated instruction fetch requests to the external instruction storage device may be avoided, and thus, many unnecessary delays of the multi-core processor may be greatly reduced, thereby improving the performance of the multi-core processor.

On the basis of the above embodiments, the method may further include at least one of:

in response to there being no cache data in the first queue of the first caching device, setting an empty state flag bit in a first empty-full state flag bit group of the first caching device to a target level value;

in response to the first queue of the first caching device is full, a full state flag bit in the first empty-full state flag bit group of the first caching device to a target level value;

in response to there being no cache data in the second queue of the first caching device, setting an empty state flag bit in a second empty-full state flag bit group of the first caching device to a target level value; or in response to the second queue of the first caching device is full, setting a full state flag bit in the second empty-full state flag bit group of the first caching device to a target level value.

Correspondingly, the method may further include: in response to detecting the full state flag bit in the first empty-full state flag bit group or the second empty-full state flag bit group of the first caching device is the target level value, receiving no more instruction fetch requests from any one of processing cores in a multi-core processor.

Sixth Embodiment

Figure 6:
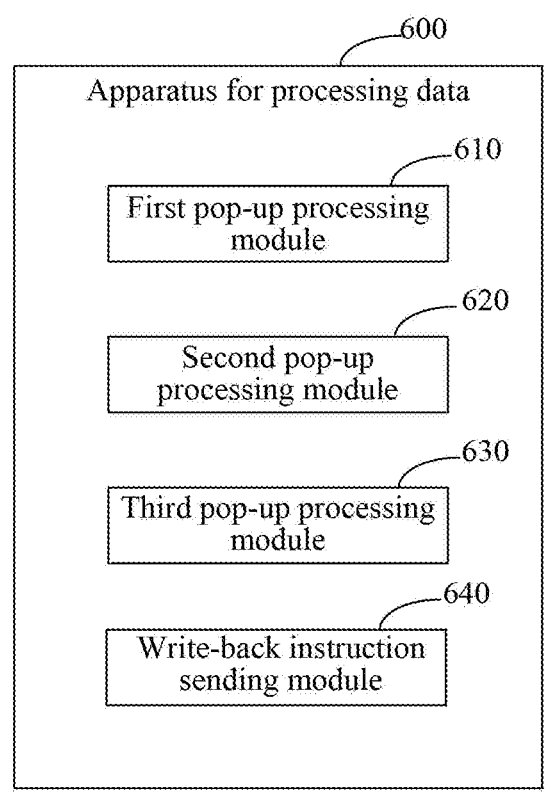
FIG. 6 is a schematic structural diagram of an apparatus for processing data provided in a sixth embodiment of the present disclosure.

FIG. 6 is a schematic structural diagram of an apparatus for processing data provided in a sixth embodiment of the present disclosure. As shown in FIG. 6, the apparatus 600 for processing data is implemented by the instruction cache in the system for processing an instruction provided in any embodiment of the present disclosure. The apparatus includes:

a first pop-up processing module 610, configured to fetch, in response to detecting that an external instruction storage device is in an idle state, a missing instruction identifier from a first queue of a first caching device, and popping up the missing instruction identifier via a first pop-up port, to provide to the external instruction storage device;

a second pop-up processing module 620, configured to fetch, in response to detecting a write-back instruction fed back by the external instruction storage device targeting at a first target missing instruction identifier, the first target missing instruction identifier from a second queue of the first caching device, and popping up the first target missing instruction identifier via a second pop-up port of the first caching device;

a third pop-up processing module 630, configured to fetch first target cache data matching the first target missing instruction identifier from a second caching device, and popping up the first target cache data through a first pop-up port or a second pop-up port of the second caching device; and a write-back instruction sending module 640, configured to identify, based on the first target cache data, a first target core identifier of a first target processing core matching the first target missing instruction identifier, and sending the write-back instruction to the first target processing core.

In this embodiment, through the two queues set in the first caching device and the pop-up ports for the different queues, pop-up processing may be respectively performed on an instruction missing identifier that has not been initiated and an instruction missing identifier that has been responded to but has not been written back by the bus, thereby greatly saving the number of the caching devices used by the instruction cache. In addition, the core identifier of the processing core matching the instruction fetch missing identifier may be synchronously popped up through the pop-up ports in the second caching device, without using a register set to store the above information, thereby reducing the complex logic control.

On the basis of the above embodiments, the apparatus may further include a first instruction missing identifier writing module, configured to:

in response to detecting that missing of an instruction fetch targeting at a second target missing instruction identifier occurs in a second target processing core, reading all missing instruction identifiers stored in the first queue and the second queue from a read port of the first caching device;

in response to the first queue and the second queue of the first caching device not storing the second target missing instruction identifier, simultaneously storing the second target missing instruction identifier into the first queue and the second queue;

generating second target cache data based on the second target processing core and mapping relationships between preset processing cores and a corresponding data bits in cache data; and pressing the second target cache data into a first queue or a second queue of the second caching device through a press-in port of the second caching device.

On the basis of the above embodiments, the apparatus may further include a second instruction missing identifier writing module, configured to:

in response to the first queue or the second queue of the first caching device storing the second target missing instruction identifier, fetching a target storage address of the second target missing instruction identifier in the first caching device;

generating third target cache data and target mask information based on the second target processing core and the mapping relationships between the preset processing cores and the corresponding data bits in the cache data; and writing the target storage address, the third target cache data and the target mask information through a write port group of the second caching device, to store, in the second caching device, a core identifier of the second target processing core matching the second target missing instruction identifier.

On the basis of the above embodiments, the apparatus may further include at least one of:

a first empty state flag bit setting module, configured to set, in response to there being no cache data in the first queue of the first caching device, an empty state flag bit in a first empty-full state flag bit group of the first caching device to a target level value;

a first full state flag bit setting module, configured to set, in response to the first queue of the first caching device is full, setting a full state flag bit in the first empty-full state flag bit group of the first caching device to a target level value;

a second empty state flag bit setting module, configured to set, in response to there being no cache data in the second queue of the first caching device, an empty state flag bit in a second empty-full state flag bit group of the first caching device to a target level value; or a second full state flag bit setting module, configured to set, in response to the second queue of the first caching device is full, a full state flag bit in the second empty-full state flag bit group of the first caching device to a target level value.

On the basis of the above embodiments, the apparatus may further include an instruction fetch request abandoning module, configured to receive, in response to detecting the full state flag bit in the first empty-full state flag bit group or the second empty-full state flag bit group of the first caching device is the target level value, no more instruction fetch requests from any one of processing cores in a multi-core processor.

Some embodiments of the present disclosure provide a readable storage medium, storing a computer instruction. The instruction, when executed by a processor, implements the method for processing data provided in all the embodiments of the present disclosure. That is, the instruction, when executed by the processor, implements:

in response to detecting that an external instruction storage device is in an idle state, fetching a missing instruction identifier from a first queue of a first caching device, and popping up the missing instruction identifier via a first pop-up port, to provide to the external instruction storage device; in response to detecting a write-back instruction fed back by the external instruction storage device targeting at a first target missing instruction identifier, fetching the first target missing instruction identifier from a second queue of the first caching device, and popping up the first target missing instruction identifier via a second pop-up port of the first caching device; fetching first target cache data matching the first target missing instruction identifier from a second caching device, and popping up the first target cache data through a first pop-up port or a second pop-up port of the second caching device; and identifying, based on the first target cache data, a first target core identifier of a first target processing core matching the first target missing instruction identifier, and sending the write-back instruction to the first target processing core.

It should be noted that the computer readable medium in the present disclosure may be computer readable medium or combination of a plurality of computer readable medium. The computer readable medium may be computer readable signal medium or computer readable storage medium. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto.

In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element.

The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

It should be understood that the various forms of processes shown above may be used to resort, add or delete steps. For example, the steps described in the present disclosure may be performed in parallel, sequentially, or in a different order. As long as the desired result of the technical solution disclosed in the present disclosure can be achieved, no limitation is made herein.

The above embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A caching device, comprising a first queue, a second queue, a write port group, a read port, a first pop-up port, a second pop-up port and a press-in port, wherein
the write port group is configured to write cache data into a set storage address in the first queue and/or the second queue;
the read port is configured to read all cache data from the first queue and/or the second queue at one time;
the press-in port is configured to press cache data into the first queue and/or the second queue;

the first pop-up port is configured to pop up cache data from the first queue; and the second pop-up port is configured to pop up cache data from the second queue.

2. The caching device according to claim 1, wherein the write port group comprises a write data port and a write address port, the write data port is configured to receive written cache data; and the write address port is configured to receive a storage address in the first queue and/or the second queue, the cache data written by the write data port being to be written to the address.

3. The caching device according to claim 2, wherein the write port group further comprises a write mask port, the write mask port is configured to receive mask information of the cache data written by the write data port; and the mask information is configured to indicate a data bit of the cache data written to the storage address, and a bit width of the write mask port is identical to a bit width of the write data port.

4. The caching device according to claim 1, further comprising a first empty-full state flag bit group and a second empty-full state flag bit group, wherein the first empty-full state flag bit group is configured to indicate a storage state of cache data in the first queue, and the second empty-full state flag bit group is configured to indicate a storage state of cache data in the second queue.

5. An instruction cache, comprising a first caching device and a second caching device according to claim 1.

6. A system for processing an instruction, comprising the instruction cache according to claim 5, a multi-core processor and an external instruction storage device, wherein the instruction cache is respectively connected to the external instruction storage device and a plurality of processing cores of the multi-core processor, and the instruction cache is connected to the external instruction storage device via a bus.

7. The system according to claim 6, wherein the multi-core processor is configured to provide, when missing of an instruction fetch occurs, a missing instruction identifier to the instruction cache;

the external instruction storage device is used to store instructions; and the instruction cache is configured to send the missing instruction identifier to the external instruction storage device and acquire an instruction responded and written back by the external instruction storage device via the bus.

8. The system according to claim 7, wherein the first caching device is configured to cache, using a first queue, an instruction fetch missing identifier that has not been responded by the external instruction storage device when the instruction fetch missing occurs, and cache, using a second queue, an missing instruction fetch identifier that has been responded but has not written back by the external instruction storage device; and the second caching device is configured to correspondingly store, using a first queue or a second queue and based on a storage address of the missing instruction fetch identifier in the first caching device, a core identifier of a processing core matching the missing instruction fetch identifier.

9. A method for processing data, performed by an instruction cache, wherein the instruction cache comprises a first caching device and a second caching device, both the first caching device and the second caching device have the a first queue, a second queue, a write port group, a read port, a first pop-up port, a second pop-up port and a press-in port, wherein the write port group is configured to write cache data into a set storage address in the first queue and/or the second queue;

the read port is configured to read all cache data from the first queue and/or the second queue at one time;

the press-in port is configured to press cache data into the first queue and/or the second queue;

the first pop-up port is configured to pop up cache data from the first queue; and the second pop-up port is configured to pop up cache data from the second queue, wherein the method comprises:

in response to detecting that an external instruction storage device is in an idle state, fetching a missing instruction identifier from a first queue of a first caching device, and popping up the missing instruction identifier via a first pop-up port, to provide to the external instruction storage device;

in response to detecting a write-back instruction fed back by the external instruction storage device targeting at a first target missing instruction identifier, fetching the first target missing instruction identifier from a second queue of the first caching device, and popping up the first target missing instruction identifier via a second pop-up port of the first caching device;

fetching first target cache data matching the first target missing instruction identifier from a second caching device, and popping up the first target cache data through a first pop-up port or a second pop-up port of the second caching device; and identifying, based on the first target cache data, a first target core identifier of a first target processing core matching the first target missing instruction identifier, and sending the write-back instruction to the first target processing core.

10. The method according to claim 9, further comprising:

in response to detecting that missing of an instruction fetch targeting at a second target missing instruction identifier occurs in a second target processing core, reading all missing instruction identifiers stored in the first queue and the second queue from a read port of the first caching device;

in response to the first queue and the second queue of the first caching device not storing the second target missing instruction identifier, simultaneously storing the second target missing instruction identifier into the first queue and the second queue;

generating second target cache data based on the second target processing core and mapping relationships between preset processing cores and a corresponding data bits in cache data; and pressing the second target cache data into a first queue or a second queue of the second caching device through a press-in port of the second caching device.

11. The method according to claim 10, wherein after the reading all missing instruction identifiers stored in the first queue and the second queue from the read port of the first caching device, the method further comprises:

in response to the first queue or the second queue of the first caching device storing the second target missing instruction identifier, fetching a target storage address of the second target missing instruction identifier in the first caching device;

generating third target cache data and target mask information based on the second target processing core and the mapping relationships between the preset processing cores and the corresponding data bits in the cache data; and writing the target storage address, the third target cache data and the target mask information through a write port group of the second caching device, to store, in the second caching device, a core identifier of the second target processing core matching the second target missing instruction identifier.

12. The method according to claim 9, further comprising at least one of:

in response to there being no cache data in the first queue of the first caching device, setting an empty state flag bit in a first empty-full state flag bit group of the first caching device to a target level value;

in response to the first queue of the first caching device is full, setting a full state flag bit in the first empty-full state flag bit group of the first caching device to a target level value;

in response to there being no cache data in the second queue of the first caching device, setting an empty state flag bit in a second empty-full state flag bit group of the first caching device to a target level value; or in response to the second queue of the first caching device is full, setting a full state flag bit in the second empty-full state flag bit group of the first caching device to a target level value.

13. The method according to claim 12, further comprising:

in response to detecting the full state flag bit in the first empty-full state flag bit group or the second empty-full state flag bit group of the first caching device is the target level value, receiving no more instruction fetch requests from any one of processing cores in a multi-core processor.

14. A non-transitory computer readable storage medium, storing a computer instruction, wherein the computer instruction is used to cause an instruction cache to perform operations, wherein the instruction cache comprises a first caching device and a second caching device, both the first caching device and the second caching device have the a first queue, a second queue, a write port group, a read port, a first pop-up port, a second pop-up port and a press-in port, wherein the write port group is configured to write cache data into a set storage address in the first queue and/or the second queue;

the read port is configured to read all cache data from the first queue and/or the second queue at one time;

the press-in port is configured to press cache data into the first queue and/or the second queue;

the first pop-up port is configured to pop up cache data from the first queue; and the second pop-up port is configured to pop up cache data from the second queue, wherein the operations comprise:

in response to detecting that an external instruction storage device is in an idle state, fetching a missing instruction identifier from a first queue of a first caching device, and popping up the missing instruction identifier via a first pop-up port, to provide to the external instruction storage device;

in response to detecting a write-back instruction fed back by the external instruction storage device targeting at a first target missing instruction identifier, fetching the first target missing instruction identifier from a second queue of the first caching device, and popping up the first target missing instruction identifier via a second pop-up port of the first caching device;

fetching first target cache data matching the first target missing instruction identifier from a second caching device, and popping up the first target cache data through a first pop-up port or a second pop-up port of the second caching device; and identifying, based on the first target cache data, a first target core identifier of a first target processing core matching the first target missing instruction identifier, and sending the write-back instruction to the first target processing core.

15. The medium according to claim 14, wherein the operations further comprise:

in response to detecting that missing of an instruction fetch targeting at a second target missing instruction identifier occurs in a second target processing core, reading all missing instruction identifiers stored in the first queue and the second queue from a read port of the first caching device;

in response to the first queue and the second queue of the first caching device not storing the second target missing instruction identifier, simultaneously storing the second target missing instruction identifier into the first queue and the second queue;

generating second target cache data based on the second target processing core and mapping relationships between preset processing cores and a corresponding data bits in cache data; and pressing the second target cache data into a first queue or a second queue of the second caching device through a press-in port of the second caching device.

16. The medium according to claim 15, wherein after the reading all missing instruction identifiers stored in the first queue and the second queue from the read port of the first caching device, the operations further comprise:

in response to the first queue or the second queue of the first caching device storing the second target missing instruction identifier, fetching a target storage address of the second target missing instruction identifier in the first caching device;

generating third target cache data and target mask information based on the second target processing core and the mapping relationships between the preset processing cores and the corresponding data bits in the cache data; and writing the target storage address, the third target cache data and the target mask information through a write port group of the second caching device, to store, in the second caching device, a core identifier of the second target processing core matching the second target missing instruction identifier.

17. The medium according to claim 14, wherein the operations further comprise at least one of:

in response to there being no cache data in the first queue of the first caching device, setting an empty state flag bit in a first empty-full state flag bit group of the first caching device to a target level value;

in response to the first queue of the first caching device is full, setting a full state flag bit in the first empty-full state flag bit group of the first caching device to a target level value;

in response to there being no cache data in the second queue of the first caching device, setting an empty state flag bit in a second empty-full state flag bit group of the first caching device to a target level value; or in response to the second queue of the first caching device is full, setting a full state flag bit in the second empty-full state flag bit group of the first caching device to a target level value.

18. The medium according to claim 17, wherein the operations further comprise:

in response to detecting the full state flag bit in the first empty-full state flag bit group or the second empty-full state flag bit group of the first caching device is the target level value, receiving no more instruction fetch requests from any one of processing cores in a multi-core processor.

* * * * *